(12) United States Patent
Berggren et al.

(10) Patent No.: US 10,707,498 B2
(45) Date of Patent: Jul. 7, 2020

(54) ELECTRIC CONNECTOR FOR FUEL CELL STACK

(71) Applicant: POWERCELL SWEDEN AB, Göteborg (SE)

(72) Inventors: Martin Berggren, Mölnlycke (SE); Robert Gustavsson, Göteborg (SE)

(73) Assignee: POWERCELL SWEDEN AB, Göteborg (SE)

( * ) Notice: Subject to any disclaimer, the term of this patent is extended or adjusted under 35 U.S.C. 154(b) by 67 days.

(21) Appl. No.: 15/562,431

(22) PCT Filed: Mar. 17, 2016

(86) PCT No.: PCT/SE2016/050224
§ 371 (c)(1),
(2) Date: Sep. 28, 2017

(87) PCT Pub. No.: WO2016/167702
PCT Pub. Date: Oct. 20, 2016

(65) Prior Publication Data
US 2018/0090771 A1    Mar. 29, 2018

(30) Foreign Application Priority Data
Apr. 16, 2015   (SE) ...................................... 1550458

(51) Int. Cl.
*H01M 8/0247* (2016.01)
*H01M 8/2404* (2016.01)
(Continued)

(52) U.S. Cl.
CPC ......... *H01M 8/0247* (2013.01); *H01M 2/202* (2013.01); *H01M 8/02* (2013.01);
(Continued)

(58) Field of Classification Search
CPC .................................................. H01M 8/0247
See application file for complete search history.

(56) References Cited

U.S. PATENT DOCUMENTS

| 10,024,927 B2 * | 7/2018 | Katano ................. H01M 8/241 |
| 2003/0054220 A1 | 3/2003 | Barton et al. |

(Continued)

FOREIGN PATENT DOCUMENTS

| JP | 2005093282 A | 4/2005 |
| JP | 2006054112 A | 2/2006 |

(Continued)

OTHER PUBLICATIONS

TranslationKR1020090006553 (Year: 2019).*

(Continued)

*Primary Examiner* — Brian R Ohara
(74) *Attorney, Agent, or Firm* — WRB-IP LLP

(57) ABSTRACT

Electric connector assembly for electrically contacting at least one bipolar plate of a fuel cell stack including at least a support structure and at least one contact pin, which is adapted to electrically contacting the bipolar plate and is supported by the support structure, wherein the support structure includes at least a rear face which is adapted to face the fuel cell stack, a front face being opposite to the rear face, and first and second side faces, wherein the rear face includes at least one bipolar plate housing slit which extends from the first side face to the second side face, and which is adapted to accommodate at least partly the bipolar plate, thereby defining a comb-shaped support structure with at least two teeth extend from a support basis, which are separated by the intermediately arranged bipolar plate housing slit, and wherein the support structure further includes at least one contact pin accommodation opening having a size which is adapted to accommodate the contact pin.

17 Claims, 3 Drawing Sheets

Figure 1:
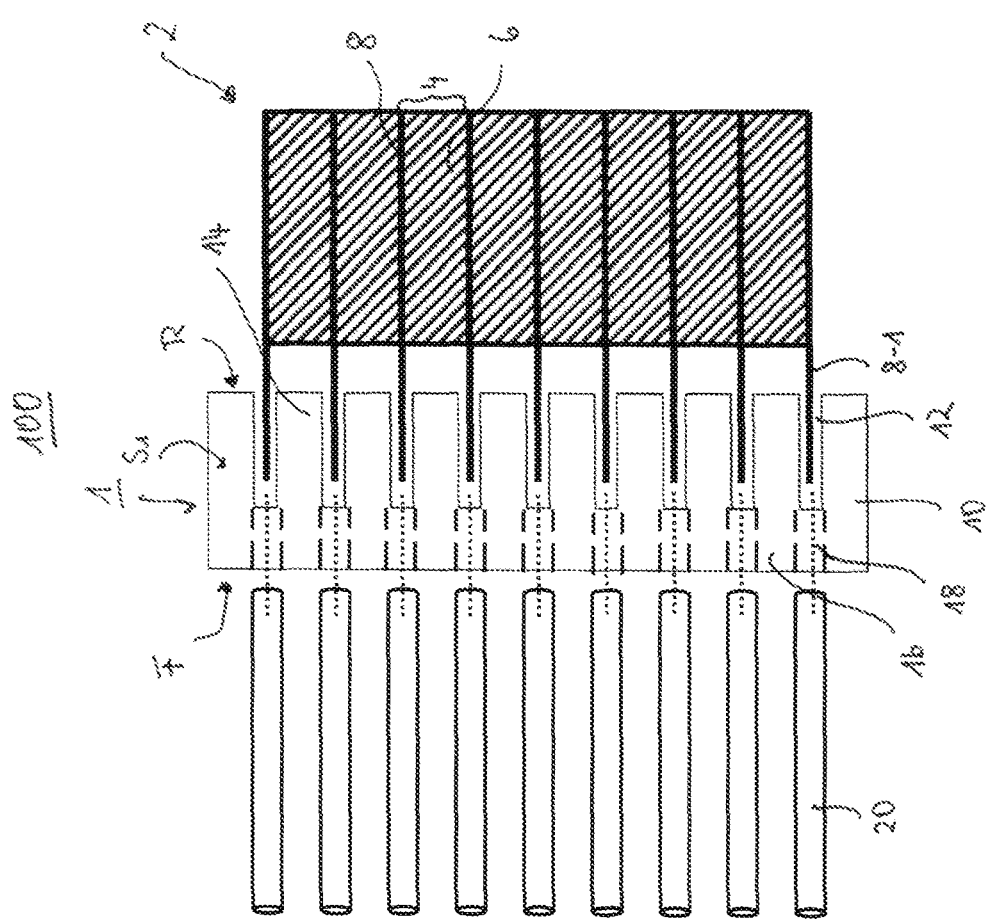

(51) Int. Cl.
  *H01M 2/20* (2006.01)
  *H01M 8/02* (2016.01)
  *H01M 8/0271* (2016.01)
  *H01M 8/04* (2016.01)
  *H01M 8/24* (2016.01)
  *H01M 8/2465* (2016.01)

(52) U.S. Cl.
  CPC ........... *H01M 8/0271* (2013.01); *H01M 8/04* (2013.01); *H01M 8/24* (2013.01); *H01M 8/2404* (2016.02); *H01M 8/2465* (2013.01)

(56) References Cited

U.S. PATENT DOCUMENTS

2008/0003482 A1* 1/2008 Komiyama ............ H01M 8/02
  429/468
2011/0285247 A1 11/2011 Lipton et al.

FOREIGN PATENT DOCUMENTS

| | | |
|---|---|---|
| JP | 2010287384 A | 12/2010 |
| JP | 2015088318 A | 5/2015 |
| KR | 20090006553 A | 1/2009 |
| WO | 20102073000 A1 | 6/2012 |

OTHER PUBLICATIONS

Japanese Official Action (dated Sep. 27, 2018) (translation) for corresponding Japanese App. 2017-553912.
International Search Report (dated Jul. 11, 2016) for corresponding International App. PCT/SE2016/050224.
Indian Official Action (dated Dec. 24, 2019) for corresponding Indian Application. 201727035572.

* cited by examiner

ELECTRIC CONNECTOR FOR FUEL CELL STACK

The present invention relates to a support structure of an electric connector for electrically contacting at least one bipolar plate in a fuel cell stack.

A fuel cell stack is usually formed by stacking a large number of unit cells into numerous layers. Each of the unit cells comprises at least a membrane electrode assembly (MEA) having an ion exchange membrane sandwiched between an anode and a cathode, and a pair of bipolar plates on both outer sides of the MEA. Through the bipolar plates hydrogen fuel and an oxidizing agent are supplied to the MEA, which generates electric power. For such a fuel cell stack, management of the power generation state of each unit cell is necessary in order to control the amounts of supplied hydrogen and oxygen and/or to find a broken or malfunctioning unit fuel cell. To enable such management, the generated voltage for each unit cell is monitored and the control is carried out based on the monitored voltage. For monitoring the voltage each bipolar plate is connected to an electrical connector, which usually comprises a housing supporting a plurality of contact elements, which are adapted to electrically contact the bipolar plates.

From the state of the art, e.g. US 2003/054220 a comb-shaped electric contact element is known, which is supported on a support structure and whose teeth are adapted to abut to the bipolar plates, whereby the electric contact is established. The disadvantage of such a connector is manifold. Firstly, the used bipolar plates must have a certain minimum thickness for allowing an electrical contact to be established by adjoining bipolar plate and electric contact element. Secondly, the electric connector easily detaches from the bipolar plates, so that additional fixing elements are required for fixing the electric connector to the fuel cell stack. A further problem is that the distances between the teeth of the electric contact must be carefully designed in order to fit to the fuel cell stack. Thereby, only minimal manufacturing tolerances are allowed, which in turn results in a costly and time-consuming manufacturing process.

From document US 2008/003482 an electric connector is known, which comprises a housing with a plurality of electric contact elements, which are arranged side by side. Each contact element has two flat rectangular stripes with outwardly bent tails, between which the bipolar plate is inserted.

The disadvantage of this state of the art is that the fuel cell stack needs a certain minimum size so that the bipolar plates may be connected to the juxtaposed contact elements. Even if one of the contact elements is already arranged on top of the other contact elements, for solving the space problem with thin fuel cells, the contact elements still need a significant space. Additionally, the support housing of the electric connector requires a special design for fitting into the available space.

A further problem of the known electric connectors is that they easily detach from the bipolar plates and are usually fixed with additional fasteners such as clamps or hooks to the fuel cell stack. Thereby, the design and manufacture of the bipolar plates and of the electric connectors is intricate, costly and time-consuming.

It is therefore desirable to provide an electric connector, which can be easily fixed to the fuel cell stack and further provides an improved electric contact to the bipolar plates, even if thin unit fuel cells are used.

According to as of invention, an electric connector assembly, a support structure for such an electric connector assembly, a fuel cell stack arrangement and a method for fastening an electric connector assembly to a bipolar plate of a fuel cell stack are provided.

In the following an electric connector assembly for electrically contacting at least one bipolar plate in a fuel cell stack and a support structure for such an electric connector assembly are disclosed, wherein the electric connector assembly comprises at least a support structure and at least one contact pin, which is adapted to electrically contacting a bipolar plate and is, in an assembled state, supported by the support structure. The support structure itself comprises at least a rear face, which is adapted to face the fuel cell stack, a front face being opposite to the rear face and at least two side faces, namely a first and second side face. Further, the rear face of the support structure comprises at least one bipolar plate housing slit, also referred to as slit in the following, which extends from the first side face to the second side face and which is adapted to accommodate a bipolar plate. Thereby, the support structure is comb-shaped having at least two teeth extending from a support basis, which are separated by the intermediately arranged bipolar housing slit.

Additionally, the support structure comprises at least one contact pin accommodation opening having a size which is adapted to accommodate the contact pin in the assembled state of the electric connector assembly. The contact pin accommodation opening itself may be arranged in the support basis extending from the front face into the slit and/or at at least one of the side faces extending at least partially from one side face to the other.

Further, the support structure and the contact pin may be provided as separate elements, which are assembled to the electric connector assembly when being mounted to the fuel cell stack. Alternatively it is also possible that the contact pins are preliminarily arranged in the contact pin accommodation openings and may be removed from and re-inserted to or inserted deeper into the openings for fixing the electric connector assembly to the bipolar plate(s).

Advantageously, the comb-shaped support structure allows for an easy application of the support structure to the bipolar plate and to the fuel cell stack, respectively, without requiring a special design of the fuel cell stack or of the bipolar plates. Additionally, the contact pins which are inserted into the contact pin accommodation openings after the support structure has been arranged at the fuel cell stack, deform the bipolar plates accommodated in the slits of the support structure, whereby the bipolar plate is clamped in the slit, which in turn results in a clamping of the support structure to the fuel cell stack. Special implementations such as fixing elements, e.g. hooks or noses, are not necessary. This in turn has the advantage that the electric connector assembly is universally applicable.

According to a further preferred embodiment the at least one contact pin is inserted into the at least one opening in an assembled state of the electric connector assembly, wherein a thickness of the support basis is determined to be smaller than a length of the contact pin so that in an assembled state the contact pin protrudes into the slit and contacts the bipolar plate. Thereby, the contact pin may be easily inserted into the opening after having arranged the support structure to the fuel cell. Insertion of the contact pin deforms and wedges the bipolar plate into the slit. This in turn results therein that the support structure and the contact pin are fixed to the bipolar plate, and the bipolar plate is electrically contacted. Thereby the electric connector can quickly and easily be assembled to the bipolar plate without providing additional fixing elements at the fuel cell and/or at the connector for fixing the connector to the fuel cell stack.

According to a further preferred embodiment the size of the contact pin accommodation opening and/or of the contact pin is greater than a thickness of the slit. Thereby the bipolar plate may be jammed between a wall of the slit and the inserted contact pin so that a friction force between slit and bipolar plate is increased. Further, it is preferred that in the walls of the slit grooves are formed into which the bipolar plate may be pressed, when the contact pin is inserted into the contact pin accommodation opening. This allows for an improved fixing off the electric contact assembly to the bipolar plate and fuel cell stack, respectively.

It is further preferred, if the at least one slit has a center line, and the at least one contact pin accommodation opening has a center line, wherein the center line of the contact pin accommodation opening is misaligned to the center line of the slit. Thereby, the contact pin will not bounce against the bipolar plate, which impedes the assembling procedure, but protrudes above or beneath the bipolar plate whereby the bipolar plate may be deformed.

According to a further preferred embodiment the electric connector assembly comprises a plurality of bipolar plate housing slits and a plurality of contact pin accommodation openings, wherein each slit comprises a single contact pin accommodation opening. Preferably a thickness of at least one support structure's teeth is adapted to at least a membrane electrode assembly of a unit fuel cell. Thereby, not only a single bipolar plate but a plurality of bipolar plates may be electrically connected using a single electric connector assembly, which speeds up the electrical contacting process.

Since the sizes of the bipolar plates and also of the membrane electrode assemblies tend to get smaller and smaller it is preferred to arrange the bipolar plate housing slits substantially in parallel to each other but the contact pin accommodation openings of adjacent bipolar plate housing slits offset from each other in a direction of a longitudinal axis of the bipolar plate housing slits. Thereby, the bipolar plate housing slits are preferably arranged along a line, preferably a diagonal, which is angled to the longitudinal axis. This has the advantage that the contact pins inserted into the openings do not interfere with each other even if small sized bipolar plates, respectively unit fuel cells, are present in the fuel cell stack. This also allows the use of thick standardized contact pins, which is very cost-effective.

According to a further preferred embodiment, a distance between two adjacent contact pin accommodation openings is determined by a required minimum distance between two adjacent contact pins for avoiding short-circuiting the pins.

It is further preferred that a distance between at least two adjacent contact pin accommodation openings is determined by a required distance between at least two correspondingly adjacent contact pins comprised in a standardized male plug and/or for being connectable to a standardized female socket. Besides the requirement of avoiding short-circuiting it is preferred to contact the contact pins by a standard plug comprising ordinarily spaced female sockets or use a standard male plug comprising contact pins for inserting the contact pins into the contact pin accommodation openings. Thereby, a plurality of individual contact pins or contact pin accommodation openings may be connected simultaneously, which increases the speed of the fuel cell stack wiring process. Thus, by providing contact pins and/or contact pin accommodation openings at a standardized distance, standardized female sockets and/or male plugs may be used, which provides a quick and cost-effective wiring process.

As mentioned above, the electric connector assembly may be provided in a disassembled state. Therefore, a further aspect of the present invention relates to a support structure for such an electric connector assembly which shows at least one of the above described features.

A further aspect of the present invention relates to a fuel cell stack arrangement comprising at least a fuel cell stack with at least one bipolar plate and at least one fuel cell unit having at least a membrane electrode assembly, and an electric connector assembly as described above. In an assembled state, the at least one bipolar plate is at least partly accommodated in the at least one bipolar plate housing slit and fastened and electrically connected to the electric contact assembly by a clamping and/or friction force applied by the contact pin inserted into the contact pin accommodation opening provided in the support structure.

A further aspect of the present invention relates to a method for fastening an electrical connector assembly as described above to a fuel cell stack arrangement comprising the steps of: arranging in each slit of the electric connector support structure at least partly a single bipolar plate, and pressing a contact pin into each contact pin accommodation opening so that the contact pin protrudes into the slit and contacts the bipolar plate, thereby the contact pin deforms and fastens the bipolar plate in the slit and to the support structure. This fastening method provides a quick and cost-effective possibility for electrically contacting a fuel cell stack as described above.

Further advantages and preferred embodiments are disclosed in the description, the drawings and the attached claims.

In the following, the present invention will be described by means of embodiments shown in the figures. The shown embodiments are exemplarily, only, and are not intended to limit the scope of protection. The scope of protection is solely defined by the attached claims.

Figure 3:
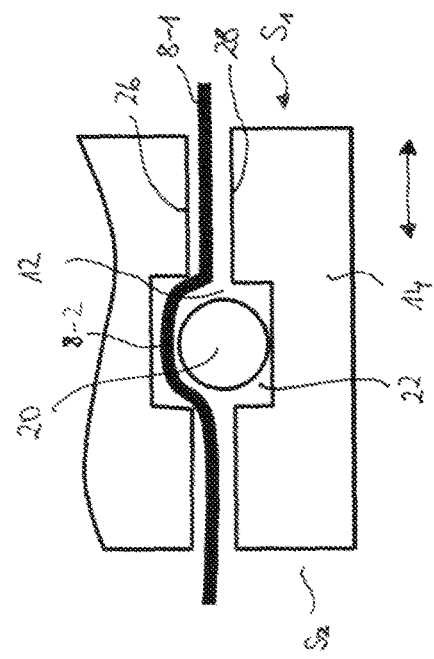
Figure 2:
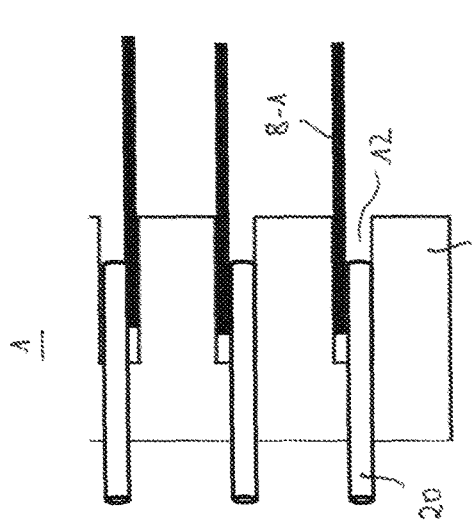

The figures show:

FIG. 1: a schematic sectional view of a first embodiment of the inventive electric connector assembly arranged at a fuel cell stack but before assembling;

FIG. 2: an enlarged view of the electric connector assembly shown in FIG. 1 in the assembled state; and FIG. 3: a perspective view of the support structure of the electric connector assembly shown in FIG. 1 and FIG. 2.

Figure 5:
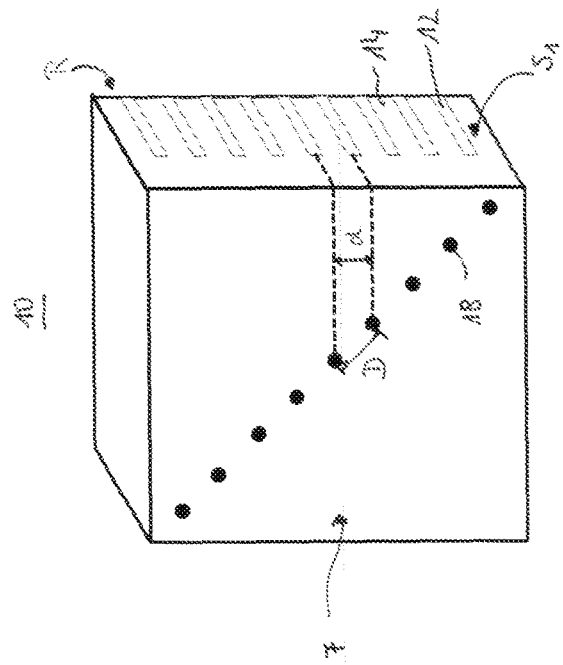
Figure 4:
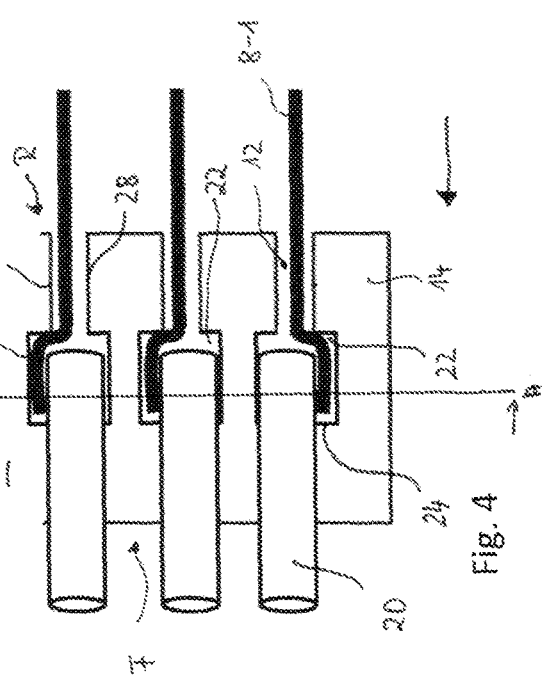

FIG. 4: an enlarged view of a second embodiment of the electric connector assembly;

FIG. 5: a sectional view through the embodiment shown in FIG. 4, along line A-A.

Figure 7:
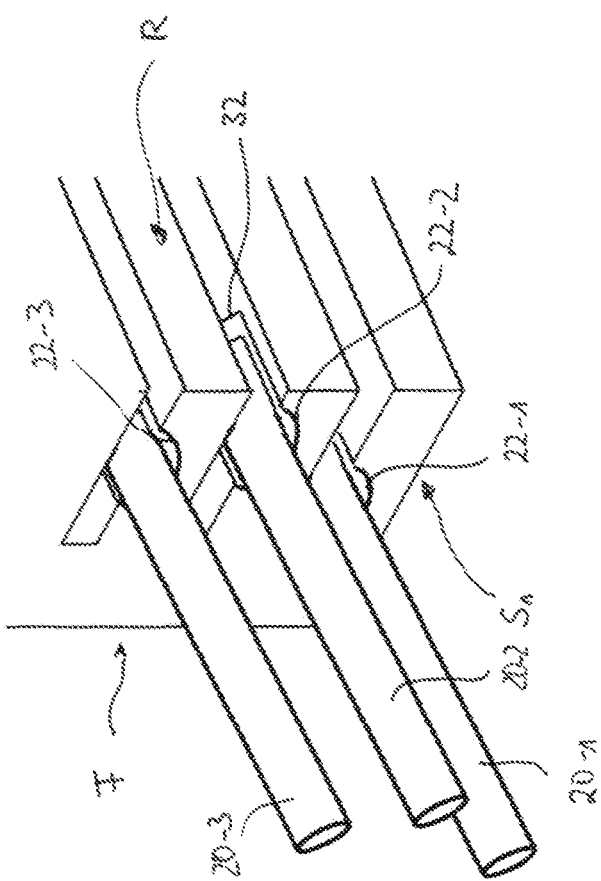
Figure 6:
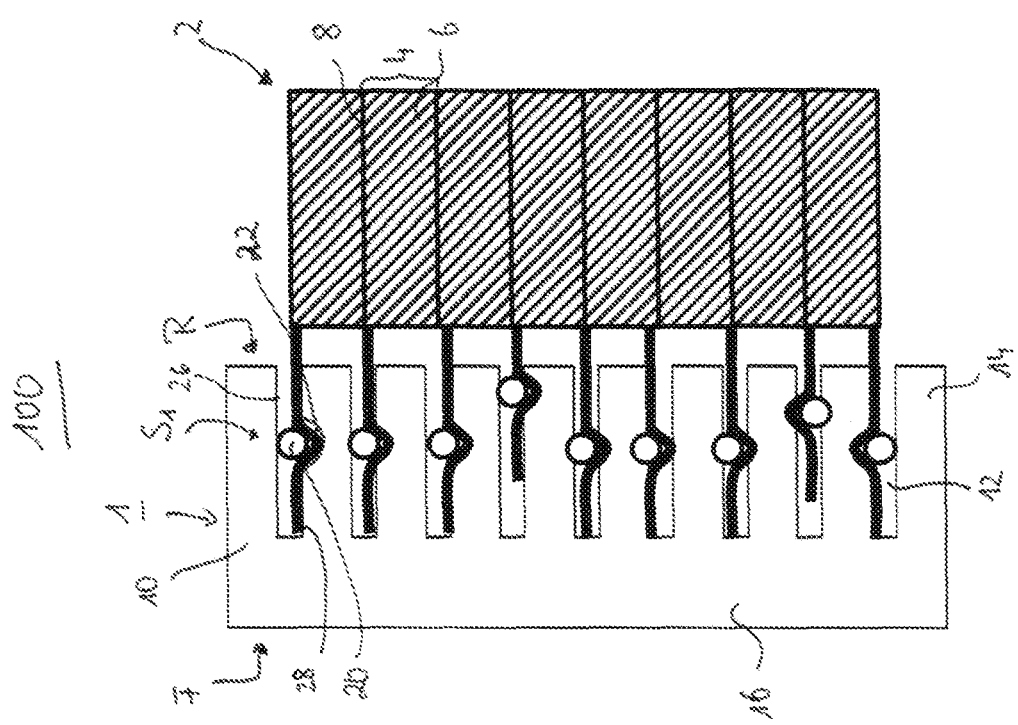

FIG. 6: a schematic sectional view of a third embodiment of the electric connector assembly before assembling;

FIG. 7: a schematic perspective view of the embodiment shown in FIG. 6 in an assembled state.

In the following same or functionally similar elements are references by the same reference signs.

FIG. 1 and FIG. 6 show sectional views of two different embodiments of an electric connector assembly 1, which is arranged at a fuel cell stack 2, forming a fuel cell stack arrangement 100. The electric connector assembly 1 is seen from one of its side face $S_1$; $S_2$ and has a front side F and, opposite thereof, a rear side R which faces the fuel cell stack 2. The fuel cell stack 2 comprises a plurality of unit fuel cells 4 having a membrane electrode assembly 6 and a bipolar plate 8, which are stacked on top of each other. Since the fuel cell stack 2 is state of the art, it will not be further described in this application. For electrically connecting the bipolar plates 8, the bipolar plates 8 stick out from the fuel cell stack, thereby defining electrically contact flags 8-1.

The electrical connector assembly 1 further comprises a support structure 10 having a plurality of bipolar plate housing slits 12 referred to as slits in the following, which define a comb-like structure and are adapted to accommodate the contact flags 8-1 of the bipolar plates 8. Between the slits 12 the support structure 10 shows teeth 14, whose thickness resembles a thickness of the membrane electrode assembly 6. Further, the support structure 10 comprises a support structure basis 16 from which the teeth protrude and whose width is defined by the depth of the slits 12. It is explicitly noted that the shown number of slits or teeth, respectively, is exemplarily, only. Any other number is also preferred. Even an electrical connector assembly 1 comprising only a single slit 12 is encompassed by this application.

In the embodiment depicted in FIG. 1, the support structure basis 16 further comprises contact pin accommodation openings 18 referred to as openings in the following, which are aligned with the slits 12 and allow accommodation of contact pins 20, which are to be inserted into the openings 18. In the assembled state depicted in FIG. 2, the contact pins 20 are adapted to protrude into the slits 12 and thereby contact the bipolar plates 8 electrically. Additionally, the contact pins 20 clamp the bipolar plates 8 in the slits 12 so that the electric connector assembly 1 is fixed by clamping and/or friction force to the fuel cell stack 2.

FIG. 3 depicts a perspective view of the support structure 10 alone from its front side F. As can be seen in FIG. 3, the openings 18 are arranged diagonally offset from each other, for providing an enlarged distance D between the openings 18. This offset allows for the use of thick standardized contact pins 20 and/or of a standardized male plug even if the thickness of the unit fuel cell 4 defined by the distance d between two slits is smaller than a minimum distance necessary for the thick standard contact pins 20. Therefore, the enlarge distance D between two openings 18, which is due to the offset alignment of the openings 18, allows the use of standardized contact pins 20 that would have been not necessarily possible with openings 18 aligned along a line which is perpendicular to an extension of the slits 12. Besides the advantage that thicker standardized contact pins may be easily handled, the standardized contact pins may also be connected to standard female plugs, which reduces the manufacturing costs.

For increasing the cohesion of the electrical connector assembly 1 to the bipolar plates 8, it is further possible to deform the bipolar plate 8 in the slit 12. Different possibilities are shown in FIGS. 4-7. Thereby, the contact pin accommodation openings 18 do not have the same size as the slits 12, but are larger (FIG. 4, 5) than or offset (FIG. 6, 7) than the slits, whereby grooves 22 are formed in the support structure 10 into which the bipolar plate deforms.

FIG. 4 and its sectional view along line A-A seen from the front face F and illustrated in FIG. 5 depict an embodiment where the grooves 22 are formed at a bottom 24 of the slits 12. Thereby, the grooves 22 may be arranged symmetrically as illustrated, whereby both side walls 26, 28 of the slits 12 are grooved. But it is also possible if only one of the side walls provide the groove 12. When inserting the contact pin 20, the bipolar plate 8 is deformed into the groove 22 as can be seen in FIG. 4 as well as in the sectional view of FIG. 5. The deformation 8-2 of the bipolar plate 8 impedes movement of the electric connector assembly sideways along the fuel cell stack (see double-arrow in FIG. 5) as well as a detaching movement of the support structure 10 from the bipolar plate (see arrow in FIG. 4). Thereby, the electric connector assembly 1 is safely fixed to the bipolar plate 8. The grooves 22 themselves may have a rectangular shape as illustrated, but can also be circularly or elliptically shaped. Further, the grooves 22 may have a similar shape to the contact pins 20.

Besides the arrangement of the contact pins 20 at a front side F as illustrated in FIGS. 1-5, the contact pins 20 may also be arranged at one of the side faces $S_1$, $S_2$ (see FIG. 7). These embodiments are shown in FIGS. 6 and 7. As can be seen from FIG. 6, the grooves 22 can be arranged in one of the wall side 28 of the teeth 14 (see upper part of FIG. 6), or in both side walls 26 and 28 (see lower part of FIG. 6). Further is illustrated that the grooves 22 may be arranged offset from each other or vertically aligned to each other. Further, it is shown that the shape of the grooves 22 resemble the shape of the contact pins 20.

FIG. 7 shows a perspective view of the embodiment shown in FIG. 6 illustrated from the side $S_1$, wherein the contact pins 20-1, 20-2, 20-3 are aligned offset to each other. The middle contact pin 20-2 further shows that the grooves 22-2 extends only partially into the slit 12, thereby defining a bottom end 32 of the groove 22-2, which in turn defines an end stop for the contact pin 20. Thereby, a defined insertion depth for the contact pin 20 and thus also a defined protrusion length of the contact pins 20 from the side face $S_1$ can be achieved. This facilitates arrangement of the pins 20 into the support structure for obtaining a standardized electric contact which can be connected to a female plug.

The defined bottom end 32 may also be realized in all other embodiments, where the grooves 22 have a defined depth (see e.g. FIG. 4).

The disclosed electrical contact assembly preferably allows for a fast and cost-effective electrical connection of the bipolar plates of a fuel cell. By clamping the support structure of the electrical connector assembly to the bipolar plates by inserting the contact pins into the contact pin accommodation openings, the fuel cell can be easily electrically contacted. Further, the electrical connector assembly may be used universally since the fuel cell stack needs not to be formed in a special way for fixing the electric connector assembly thereto. Further, the offset arrangement of the openings and of the contact pins, respectively, allows use of standardized contact pins even for thin bipolar plates, where a longitudinal distance between the slits would not be sufficient for arranging the contact pins vertically or horizontally.

REFERENCE NUMERALS 1 electrical connector assembly
2 fuel cell stack
4 unit fuel cell
6 membrane electrode assembly
8 bipolar plate
8-1 electric contact flag
8-2 deformation
10 support structure
12 bipolar plate housing slit
14 teeth
16 support structure basis
18 contact pin accommodation openings
20 contact pin
22 groove
24 bottom of the slit
26, 28 side walls of the slit
32 bottom end of groove

The invention claimed is:

1. Electric connector assembly for electrically contacting at least one bipolar plate of a fuel cell stack comprising at least a support structure and at least one contact pin, which is adapted to electrically contact the bipolar plate and is supported by the support structure, wherein the support structure comprises at least a rear face which is adapted to face the fuel cell stack, a front face being opposite to the rear face, and first and second side faces, wherein the rear face comprises at least one bipolar plate housing slit which extends from the first side face to the second side face, and which is adapted to accommodate at least partly the bipolar plate, thereby defining a comb-shaped support structure with at least two teeth extending from a support basis, which are separated by the intermediately arranged bipolar plate housing slit, and wherein the support structure further comprises at least one contact pin accommodation opening, each of the at least one contact pin accommodation opening having a size which is adapted to accommodate a single contact pin, wherein the at least one contact pin accommodation opening is arranged in the support basis and extends at least from the front face to the bipolar plate housing slit, thereby defining a contact pin hole in the front face and wherein the support structure comprises a plurality of bipolar plate housing slits and a plurality of contact pin accommodation openings, wherein each slit comprises a single opening, wherein the contact pin accommodation opening extends through the support basis and protrudes into the bipolar plate housing slit, whereby a groove is formed in at least one side wall of the teeth, thereby forming an enlarged space at a bottom of the bipolar plate housing slit.

2. Electric connector assembly according to claim 1, wherein the at least one contact pin is inserted in the at least one contact pin hole in an assembled state of the electric connector assembly, wherein a width of the support structure's support basis is determined to be smaller than a length of the contact pin so that, in an assembled state, the contact pin protrudes into the bipolar plate housing slit.

3. Electric connector assembly according to claim 1, wherein a size of the contact pin accommodation opening and/or of the contact pin is greater than a thickness of the bipolar plate housing slit.

4. Electric connector assembly according to claim 1, wherein, the groove has a groove bottom defining a maximum insertion depth for the contact pin into the groove.

5. Electric connector assembly according to claim 1, wherein the slits are arranged in parallel to each other and the contact pin accommodation openings of adjacent slits are arranged offset from each other.

6. Electric connector assembly according to claim 1, wherein a distance between two adjacent contact pin accommodation openings is determined by a required minimum distance between two adjacent contact pins for avoiding short-circuiting the contact pins.

7. Electric connector assembly according to claim 1, wherein a distance between at least two adjacent contact pin accommodation openings is determined by a required distance between at least two correspondingly adjacent contact pins of a male plug and/or for being connectable to a female plug socket.

8. Fuel cell stack arrangement comprising at least a fuel cell stack with at least one fuel cell unit comprising at least one bipolar plate and at least one membrane electrode assembly, and an electric connector assembly according to claim 1, wherein, in an assembled state, the at least one bipolar plate is at least partly accommodated in the at least one bipolar plate housing slit and fastened by a clamping force applied by the contact pin.

9. Electric connector assembly for electrically contacting at least one bipolar plate of a fuel cell stack comprising at least a support structure and at least one contact pin, which is adapted to electrically contact the bipolar plate and is supported by the support structure, wherein the support structure comprises at least a rear face which is adapted to face the fuel cell stack, a front face being opposite to the rear face, and first and second side faces, wherein the rear face comprises at least one bipolar plate housing slit which extends from the first side face to the second side face, and which is adapted to accommodate at least partly the bipolar plate, thereby defining a comb-shaped support structure with at least two teeth extending from a support basis, which are separated by the intermediately arranged bipolar plate housing slit, and wherein the support structure further comprises at least one contact pin accommodation opening, each of the at least one contact pin accommodation opening having a size which is adapted to accommodate a single contact pin, wherein the at least one contact pin accommodation opening extends at least partly from one side face to the other side face, wherein the contact pin accommodation opening forms a groove in at least one side wall of the teeth and wherein the support structure comprises a plurality of bipolar plate housing slits and a plurality of contact pin accommodation openings, wherein each slit comprises a single opening.

10. Electric connector assembly according to claim 9, wherein the at least one contact pin is inserted in the at least one contact pin hole in an assembled state of the electric connector assembly, wherein a width of the support structure's support basis is determined to be smaller than a length of the contact pin so that, in an assembled state, the contact pin protrudes into the bipolar plate housing slit.

11. Electric connector assembly according to claim 9, wherein a size of the contact pin accommodation opening and/or of the contact pin is greater than a thickness of the bipolar plate housing slit.

12. Electric connector assembly according to claim 9, wherein the contact pin accommodation opening extends through the support basis and protrudes into the bipolar plate housing slit, whereby a groove is formed in at least one side wall of the teeth, thereby forming an enlarged space at a bottom of the bipolar plate housing slit.

13. Electric connector assembly according to claim 12, wherein, the groove has a groove bottom defining a maximum insertion depth for the contact pin into the groove.

14. Electric connector assembly according to claim 9, wherein the slits are arranged in parallel to each other and the contact pin accommodation openings of adjacent slits are arranged offset from each other.

15. Electric connector assembly according to claim 9, wherein a distance between two adjacent contact pin accommodation openings is determined by a required minimum distance between two adjacent contact pins for avoiding short-circuiting the contact pins.

16. Electric connector assembly according to claim 9, wherein a distance between at least two adjacent contact pin accommodation openings is determined by a required distance between at least two correspondingly adjacent contact pins of a male plug and/or for being connectable to a female plug socket.

17. Fuel cell stack arrangement comprising at least a fuel cell stack with at least one fuel cell unit comprising at least one bipolar plate and at least one membrane electrode assembly, and an electric connector assembly according to claim 9, wherein, in an assembled state, the at least one bipolar plate is at least partly accommodated in the at least one bipolar plate housing slit and fastened by a clamping force applied by the contact pin.

\* \* \* \* \*